United States Patent Office 3,050,557
Patented Aug. 21, 1962

3,050,557
N-TERTIARY-BUTYL - 1,4,5,6 - TETRACHLORO-7,8-DIOXOBICYCLO(2.2.2.)OCT-5 - ENE - 2 - CARBOXAMIDE
Carleton W. Roberts, Midland, Mich., assignor to The Dow Chemical Company, Midland, Mich., a corporation of Delaware
No Drawing. Filed Aug. 5, 1960, Ser. No. 47,587
2 Claims. (Cl. 260—557)

This invention relates to a new chemical compound, N - tert - butyl - 1,4,5,6 - tetrachloro-7,8 - dioxobicyclo-(2,2,2)oct-5-ene-2-carboxamide, and to a method for its preparation.

The novel compound of the present invention has the formula:

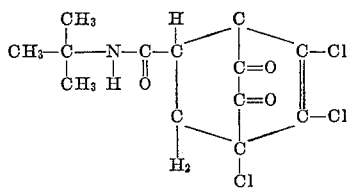

and is conveniently prepared by reacting o-chloranil and N-tert-butylacrylamide for a period of time sufficient to effect substantially complete reaction. The reaction is carried out preferably at about the reflux reaction temperature and at atmospheric pressure or thereabout. Although virtually any proportion of reactants will result in the formation of some of the desired product, the ratio of o-chloranil to N-tert-butylacrylamide is desirable maintained at from 1:2 to 2:1 with about a 1:1 ratio being preferred. It is convenient, but not necessary, to employ a solvent for the reaction so as to facilitate handling of the reaction product. Preferably the solvent is one in which the reaction product is soluble at elevated temperatures and relatively insoluble at lower temperatures. Suitable solvents which may be employed include benzene, toluene, xylene, and n-heptane. At the conclusion of the reaction, the reaction product may be separated from the reaction mixture by any conventional means, such as by distillation or recrystallization. The product may be purified by recrystallization or distillation, if desired.

The novel compound of the present invention has shown outstanding utility as a fungicide. As an example illustrating this fungicidal property, 0.25 ml. of acetone containing a small amount of the novel compound was added to 24 ml. of sterile distilled water in a 1-ounce bottle and the mixture buffered to pH of 7 with a 0.01 molar solution of a mixture of monobasic and dibasic potassium phosphate. A control was similarly prepared, except that none of the novel compound was added. One ml. of a standardized suspension of mycelial fragments of *Rhizoctonia solani* was then added to each of the bottles, the bottles capped and the contents mildly agitated on a shaker for 24 hours. At the end of this period 1 ml. of the suspension was withdrawn from each of the bottles, plated in a nutrient agar medium, and the plates incubated for 64 hours. The percent control was then determined by visual observation of fungus growth on the two plates. It was found that the novel compound of the present invention at a concentration of 10 p.p.m. had effected a 100 percent inhibition of the fungus compared to zero percent kill by the blank sample.

The compound of the present invention has also shown exceptional utility as an insecticide. As an example of this valuable utility, a group of nymphs of the lone star tick, *Amblyomma americanum* were dipped into an acetone solution containing 1 percent of the novel compound of the present invention based on the volume of acetone used; the specimens were held in the solution for about three seconds, then withdrawn, placed on absorbent paper and allowed to dry, then placed in vials and the vials stoppered. A second group of nymphs were similarly treated except that they were dipped into acetone containing none of the novel compound of the present invention. On the fourth day after treatment all specimens were inspected and it was found that the acetone solution had effected a 100 percent kill of the test specimens while the control specimens had not been perceptibly affected.

The compound of the present invention has demonstrated proven utility as a miticide. A series of experiments illustrating this valuable property were conducted as follows:

A group of young cranberry bean plants were used as hosts for 2-spotted spider mites, a known number of mites being placed on each plant prior to application of the test chemical. The infested plants were then dipped into an aqueous dispersion of the compound of the present invention, said dispersion containing 0.05 percent by weight of the test compound. The plants were withdrawn and allowed to remain untouched for three days and were then inspected to determine the percent kill effected by the chemical treatment. It was found that 70 percent of the mites used had been killed.

The practice of the present invention is illustrated by the following example.

*Example*

A mixture of 28.4 grams (0.115 mole) of o-chloranil, 25.4 grams (0.2 mole) of N-tert-butylacrylamide and 250 ml. of toluene was placed in a 500 ml. round-bottomed flask equipped with a reflux condenser and a heating mantle. The mixture was heated to 100° C. and maintained thereat for 2 hours, and then was refluxed for 27.5 hours at a pot temperature of 120° C. The heating was then stopped, the mixture chilled in an ice bath and the solid which had slowly precipitated during the cooling was filtered from the reaction mixture. The product was taken up in toluene, a small amount of Norite added, and the product recrystallized from toluene. There were obtained 48 grams of crude N-tert-butyl-1,4,5,6-tetrachloro-7,8 - dioxobicyclo(2.2.2)oct - 5 - ene - 2 - carboxamide which, after a second recrystallization from toluene, melted at 216–217° C.

I claim:
1. N - tert - butyl - 1,4,5,6 - tetrachloro - 7,8 - dioxobicyclo(2.2.2)oct-5-ene-2-carboxamide.
2. A method for preparing N-tert-butyl-1,4,5,6-tetrachloro - 7,8 - dioxobicyclo(2.2.2)oct - 5 - ene - 2 - carboxamide, comprising, reacting o-chloranil with N-tert-butylacrylamide in a suitable solvent at about atmospheric pressure and at about the reflux reaction temperature, said reactants being combined in the molar proportions of from about 1:2 to 2:1, and separating said carboxamide from the reaction mixture.

References Cited in the file of this patent

Horner et al.: Justus Liebigs Annalen der Chemie, vol. 570, pages 89–120 (1950), pp. 89–92, 94–96, 112–116 relied on.

Surrey: Name Reaction in Organic Chemistry, published by Academic Press Inc., N.Y., pages 56–57 (1954).